United States Patent [19]

van Wingerden

[11] Patent Number: 4,771,912

[45] Date of Patent: Sep. 20, 1988

[54] METHOD AND APPARATUS FOR DEPOSITING ARTICLES SUCH AS SEEDS

[76] Inventor: Aart van Wingerden, R.R. 2, Fletcher, N.C. 28732

[21] Appl. No.: 929,860

[22] Filed: Nov. 13, 1986

[51] Int. Cl.$^4$ .......................... A01C 1/04; B65B 25/02
[52] U.S. Cl. ......................................... 221/75; 47/1 A; 111/1; 141/104; 206/538; 221/89; 221/152
[58] Field of Search ...................... 111/1, 34; 47/1 A; 141/9, 104, 238; 206/538, 539; 221/82–91, 151, 152, 154, 75

[56] References Cited

U.S. PATENT DOCUMENTS

| | | | |
|---|---|---|---|
| 2,765,957 | 10/1956 | Andres | 111/1 |
| 3,073,486 | 1/1963 | Ratcliffe | 222/162 |
| 3,307,749 | 3/1967 | Ursetta | 222/276 |
| 3,372,654 | 3/1968 | Bell | 141/9 |
| 4,072,251 | 2/1978 | Huang | 111/1 X |
| 4,101,284 | 7/1978 | Difiglio et al. | 221/264 |
| 4,221,175 | 9/1980 | Van Wingerden et al. | 111/1 |
| 4,398,578 | 8/1983 | Walters et al. | 141/238 |
| 4,466,554 | 8/1984 | Hanacek et al. | 221/1 |
| 4,620,390 | 11/1986 | Mekler | 47/1 A X |

FOREIGN PATENT DOCUMENTS

| | | | |
|---|---|---|---|
| 3501703 | 8/1985 | Fed. Rep. of Germany | 47/1 A |
| 472627 | 8/1975 | U.S.S.R. | 221/91 |
| 83/03518 | 4/1982 | World Int. Prop. O. | 47/1 A |

*Primary Examiner*—James R. Feyrer
*Attorney, Agent, or Firm*—David M. Carter

[57] ABSTRACT

There is provided an improved cassette particularly adapted for sowing seeds utilizing a plurality of adjacent stacked plates having a plurality of perforations therein. The perforations are adapted to receive seeds. The seeds in the perforations of each plate are held in place by portions of a lower adjacent plate. Adjacent plates are adapted to be moved relative to one another for a short distance for aligning the perforations thus permitting the seeds from an upper plate to pass through the perforations in the plates below it for planting.

20 Claims, 4 Drawing Sheets

FIG. 4 (A-D)

METHOD AND APPARATUS FOR DEPOSITING ARTICLES SUCH AS SEEDS

BACKGROUND OF THE INVENTION

This invention relates to a method and apparatus for depositing articles, in particularly seeds. More particularly, it relates to improvements in cassettes for sowing seeds.

Many plants, especially flowers and vegetables as well as many trees, are first grown as seedlings in greenhouses in small containers before being transplanted into larger containers or in the ground. Usually one or two seeds are planted in a small container which carries nutrients for growth. Normally the containers are connected together in a matrix called a seedling tray.

The procedure for sowing seeds in seedling trays has been largely mechanized. One mechanized apparatus is disclosed in U.S. Pat. No. 4,221,175 issued to Aart Van Wingerden et al. The Van Wingerden Patent teaches the use of a tray having a plurality of embossments therein with each embossment receiving a seed. The tray is covered by a plate having a matrix of holes which align with the embossments in the tray. Between the tray and the plate are a number of rods each of which has a plurality of holes there through. The rods block the movement of the seeds out of the embossments while the apparatus is in one position; however the tray and plate are adapted to be rotated 180° contacting an apparatus which includes a plurality of tubes extending into the tops of each container of a seedling tray. Once this inversion takes place the rods may be rotated 90° so that the holes in the container and plate will align with the holes in the rods thereby permitting the seeds to pass through into the tubes and into the seedling tray.

While the Van Wingerden Patent represents an early mechanization of the planting process, the apparatus disclosed therein is somewhat complicated and is slow in operation. More recently a cassette has been developed by Van Wingerden which is shown in FIGS. 1 and 2.

The Van Wingerden cassette 10 utilizes a plurality of plates 12 which are stacked one upon another. Contact between adjacent plates is made by means of raised rim 14 as shown in FIG. 1. Studs 16 snap into corresponding holes (not shown) on the bottom side of the adjacent plate. A plurality of perforations 18 are received in each plate 12. The perforation receiving portion 20 of the plate is slightly recessed from rim 14. The recess is provided to accommodate blocking paper layer 22 which is slidably received between each adjacent plate.

The perforations in each plate except for the bottom plate 24 are adapted to receive a seed 26. The cassette is adapted to be placed on the top of seed distribution means 28 which is shown in FIG. 5.

The perforations 30 of the bottom plate align with holes 32 of the distribution means. When it is time to plant the seeds in trays 34, the lowermost paper 36 is removed from its position between the adjacent plates and the seeds from plate 38 will pass through perforations 30 in plate 24 through holes 32 in distribution means 28 through tubes 40 and are planted in containers 34. Once the container 33 is fully planted a new container is placed under tubes 40 and the next paper 42 which is the one just above paper 36 is removed from its position between adjacent plates and another group of seeds are planted. This process continues until all of the seeds in cassette 10 have been planted.

While the Van Wingerden cassette utilizing the blocking paper technique represents a simplification and improvement over the Van Wingerden seeding technique set forth in U.S. Pat. No. 4,221,175 this technique is not without its problems. It has been found that in moving the paper between the plastic plates, static electricity is formed, provides an attraction between the plastic plates and seeds, often causing the seeds to stick in the cassette.

Furthermore, it has been found that as the paper is pulled out, the seed moves with the paper and often becomes wedged between plates.

Another problem occurs in manufacturing the plates and the paper. Very close tolerances are required for the dimensions of the paper and recessed portion 20 over which paper 22 is received. When the paper or recess is somewhat out of specification it is very difficult to place the paper in the cassette as well as pull it out of the cassette.

OBJECTS OF THE INVENTION

It is therefore one object of this invention to provide an improved method and apparatus for depositing articles.

It is another object to provide an improved method and apparatus for sowing seeds.

It is another object to provide an improved cassette for use with an automated seed sowing apparatus.

It is still another object to provide an improved seed sowing cassette which overcomes the deficiencies of the prior art cassettes.

SUMMARY OF THE INVENTION

In accordance with one form of this invention, there is provided a cassette for carrying and sowing seeds including a plurality of plates stacked one upon another forming adjacent layers. Each plate has a plurality of perforations therein with the perforations arranged in substantially the same pattern on each plate. Each perforation in at least one of the plates is adapted to contain at least one seed. At least one of the plates is enabled to move relative to its adjacent plate so that the perforations on adjacent plates may be aligned with one another thus the seeds may drop through the perforations in lower plate for planting.

In accordance with another form of this invention a method of utilizing the stacked cassette described above is provided, including the steps of moving one plate of adjacent pair; aligning the perforations of the adjacent pair; and passing the seeds of the upper plate through the perforations of the adjacent lower plate thereby planting the seeds from the upper plate.

The above described apparatus and method may also be used in conjunction with articles other than seeds such as, for example, pharmaceuticals and chemicals.

DESCRIPTION OF THE DRAWINGS

The subject matter which is regarded as the invention is set forth in the appended claims. The invention itself however together with further objects and advantages thereof may be better seen in reference to the following description taken in conjunction with the accompanying drawings in which:

FIG. 4(a-d) is a partial cross-sectional elevational view of the cassette of FIG. 4 taken through section line B—B.

DESCRIPTION OF THE PREFERRED EMBODIMENT

Referring now more particularly to FIGS. 3 through 10, there is provided cassette 44 which includes a plurality of plates 46 stacked upon one another forming a plurality of adjacent layers. For simplicity only 4 plates are illustrated, however, normally as many as fifty plates are stacked together.

Figure 1:
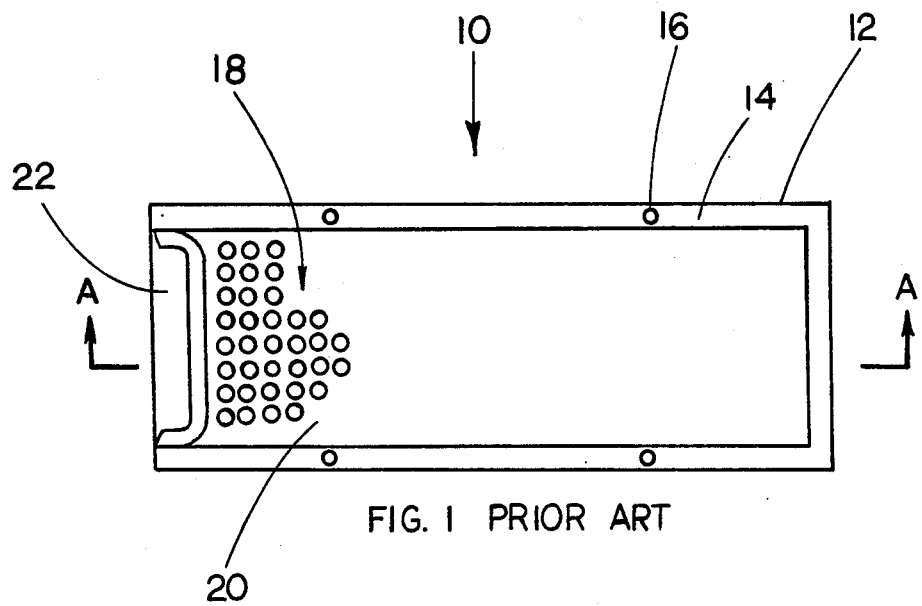
FIG. 1 is a plan of a prior art seed cassette.
Figure 2:
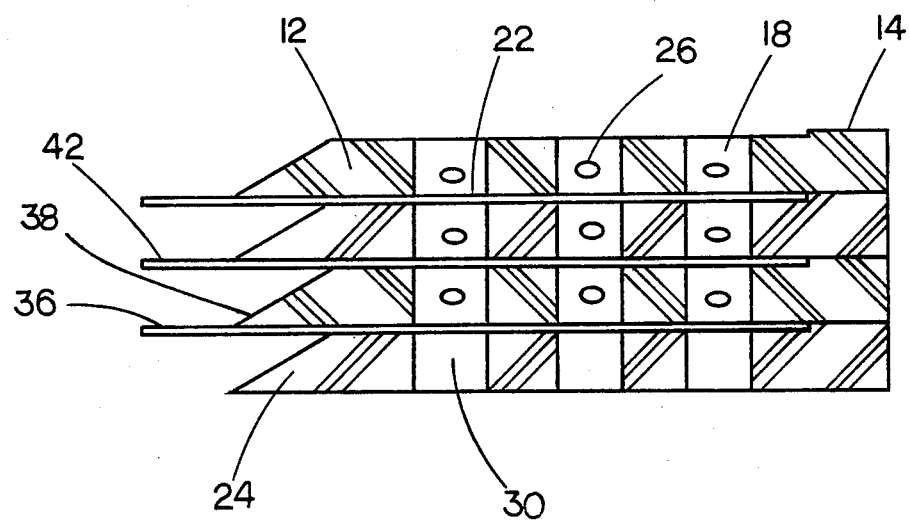
FIG. 2 is a partial cross-sectional elevational view of the cassette of FIG. 1 taken through section line A—A.
Figure 3:
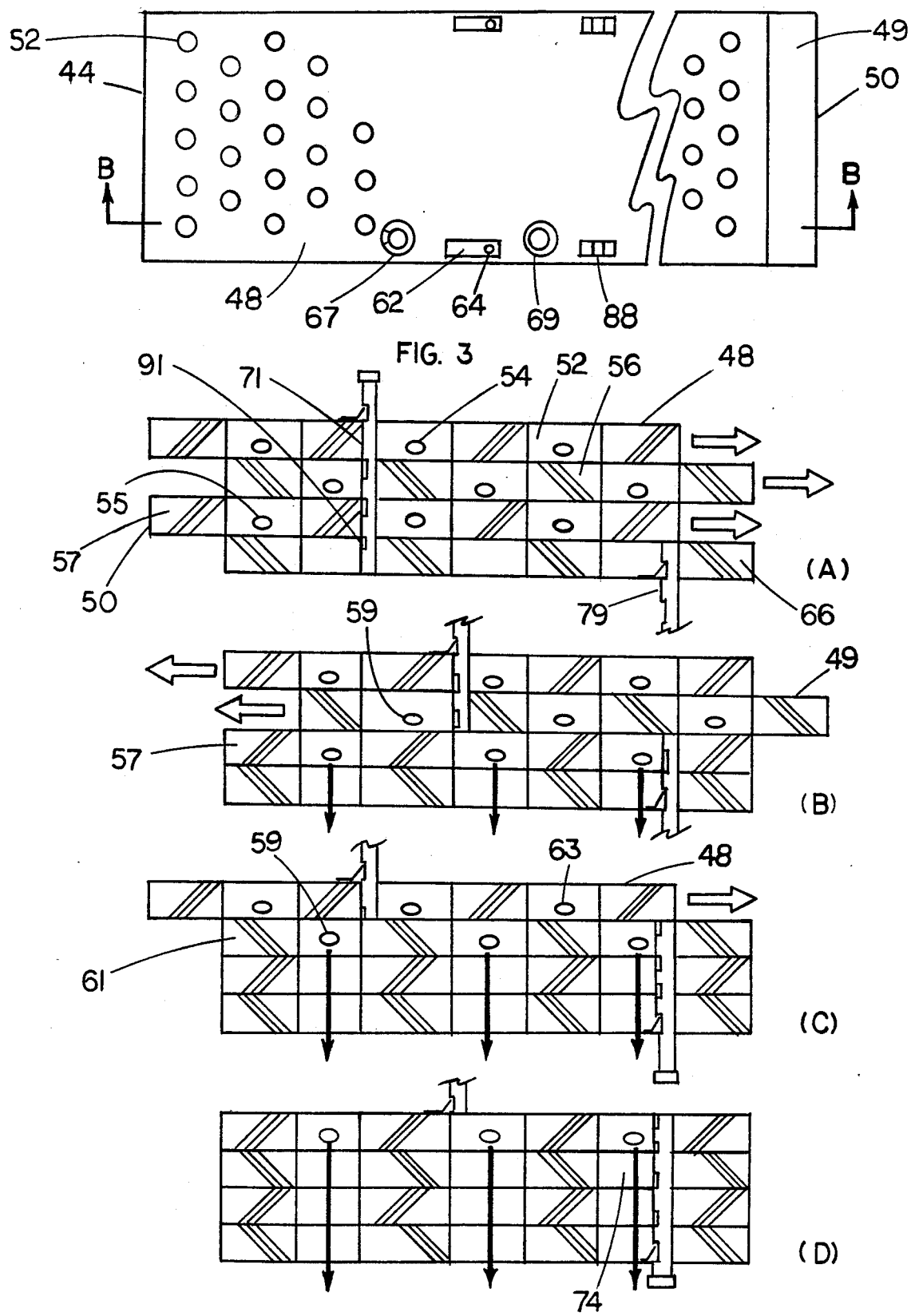
FIG. 3 is a plan view of the seed cassette of the subject invention.

Top plate 48 as well as one end 50 of the next lower plate 49 extending therefrom is shown in FIG. 3. Each of the plurality of stacked plates includes a plurality of perforations 52 which, preferably are arranged in rows and columns. Again for simplicity only a few perforations are illustrated, however, normally about 320 perforations are provided in each plate. Perforations 52 extend completely through each plate. The plates preferably are made of a plastic material so that there is very little friction between them and therefore may easily slide relative to one another.

Referring to FIG. 4(a-d), the perforations 52 in all plates except for the bottom plate are adapted to house at least one seed 54. The plates are arranged such that solid portions 56 of each lower plate provide a floor for each perforation in the corresponding adjacent upper plate thus securing the seeds 54 within the perforations. The cassette illustrated in FIG. 4(a) is in its seed loaded condition with each adjacent plate being slightly offset with respect to its adjacent plate creating the floor for the perforations.

The horizontal arrows in FIG. 4(a) indicate that all the plates above the fixed bottom plate 66 must be moved to the right in order to drop the seeds 55 which are housed in plate 57. The result of the movement of those top plates to the right are shown in FIG. 4(b) and the vertical arrows indicate that the seeds are dropping out. The horizontal arrows shown in FIG. 4(b) indicate that all of the plates above the highest empty row 57 must be slid to the left so that the seeds 59 in the next lowest loaded plate 61 may drop its seeds. The result of that movement of plates is shown in FIG. 4(c) whereby the seeds 59 drop from plate 61. The horizontal arrow in FIG. 4(c) indicates that all the plates above the highest empty plate must be moved to the right in order to drop seeds 63 which are housed in plate 48 and the results are shown in FIG. 4(d).

A cover (not shown) may be provided over the top of plate 46 to prevent the seeds in the top plate from falling out during transport and also to protect the seeds from humidity. Each plate includes at least two elongated slots 62 each receiving rod 64. The rods and slots permit adjacent plates to slide relative to one another but inhibit the plates from sliding too far so that they will not become separated in their sliding direction. Preferably the slots in the bottom plate are not elongated but are round forming a tight fit with the rod since the bottom plate will not slide.

Figure 10:
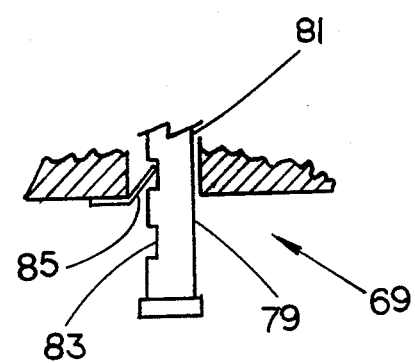
FIG. 10 is a partial cross-sectional view of the bottom locking mechanism of the cassette shown in FIG. 6 taken through line D—D.

In order to maintain the plates in their proper positions relative to one another so that only the seeds from one plate are sown at a time, top locking mechanism 67 and bottom locking mechanism 69 are provided. The top locking mechanism may be better seen in reference to FIGS. 6 and 9. The top locking mechanism includes rod 71 which passes through bore hole 73 which is formed by the alignment of holes through each plate which is loaded with seeds. Rod 71 includes a plurality of ratchet detents 75 which receive spring member 77 which is attached to the top plate only. As shown in FIG. 10, lower locking mechanism 69 includes rod 79 received in bore hole 81 which is formed by the individual holes in the plates and which become aligned with one another as the plates become empty of seeds as will be explained below. Rod 79 also includes ratchets 83 which abut against spring member 85 which extends inwardly into the bottom plate only. Spring member 85 projects inwardly against the ratchets 83 to prevent rod 79 from falling from the bottom of the cassette. As can be seen from FIG. 4(a-d) rod 71 maintains contact with all the seed containing plates so that those plates are moved together. Rod 71 is pulled above a plate as the next group of seeds drops from the plate. On the other hand, rod 79 stays in contact with the plates that no longer contain seeds and maintains those plates in a fixed position. Rod 79 is pushed upwardly the distance corresponding to the thickness of one plate as a plate is emptied of its seeds. Adjacent ratchet detents on each rod are spaced apart equal to the thickness of a plate.

As can be seen in FIG. 4(a-d) alternate layers of the plates are offset from one another thereby creating the overhanging ends 50. When it is desirable to sow seeds from the cassette one end 50 of the lowest plate containing seeds is simply pushed so that it becomes flush with the end of its lower adjacent non-seed containing plate causing the perforations 52 in adjacent plates to become aligned with one another. Since the seed containing plates are locked together by upper locking mechanism 67 all of the seed containing plates will move together.

Figure 5:
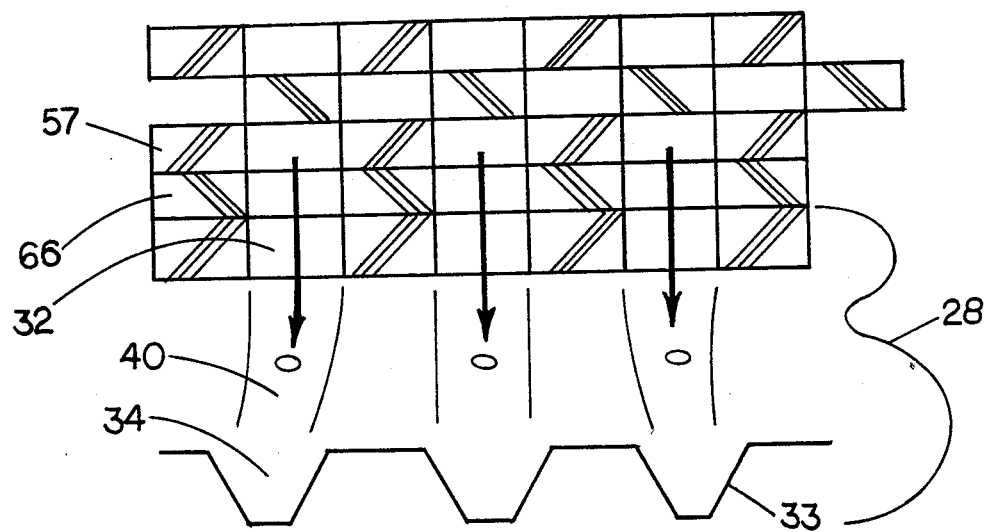
FIG. 5 is a side view of a portion of the cassette of FIG. 4 mounted on a seed distribution means.
Figure 6:
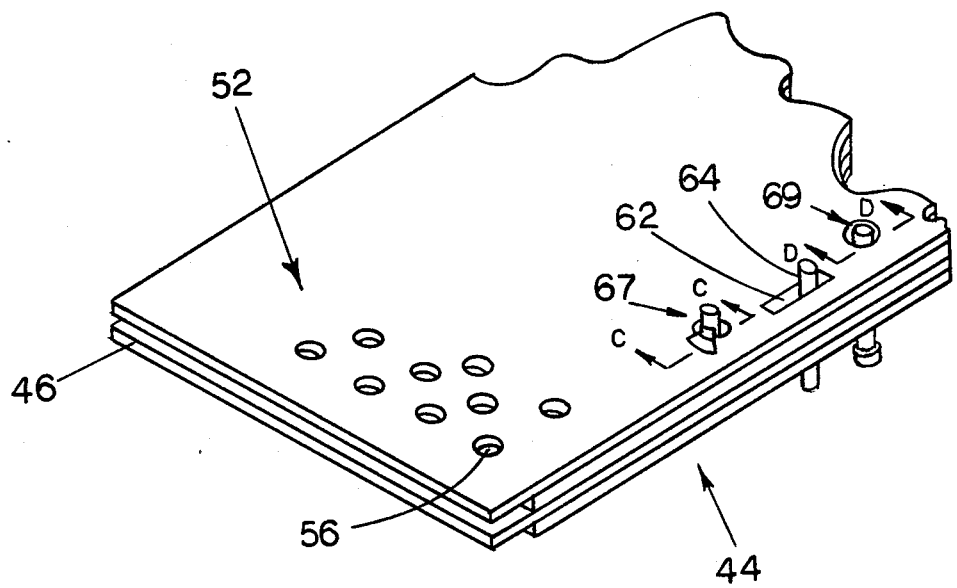
FIG. 6 is a partial prospective view of the cassette of FIG. 3.
Figure 7:
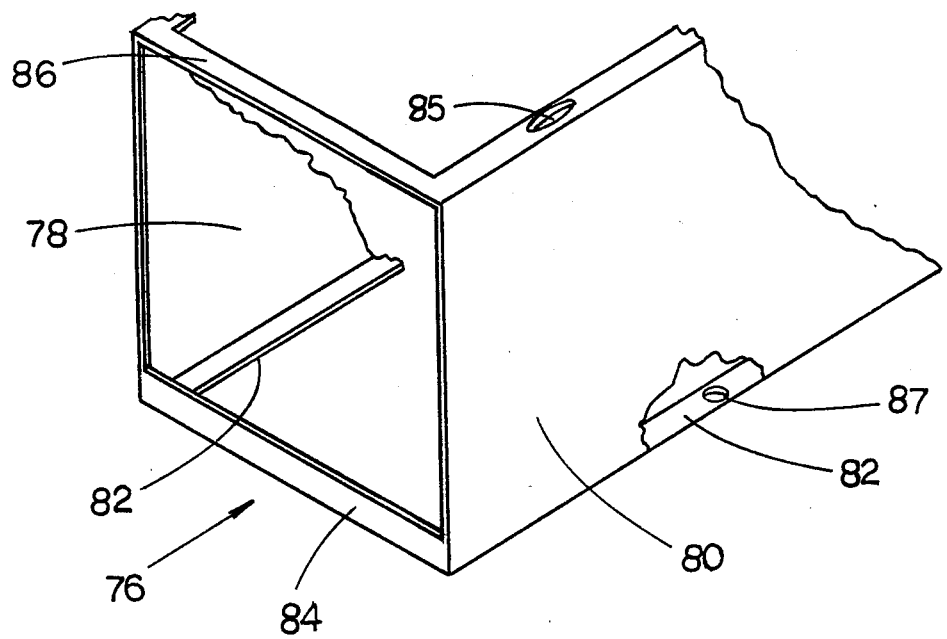
FIG. 7 is a partial prospective view of a box for containing the cassette of FIG. 6.
Figure 8:
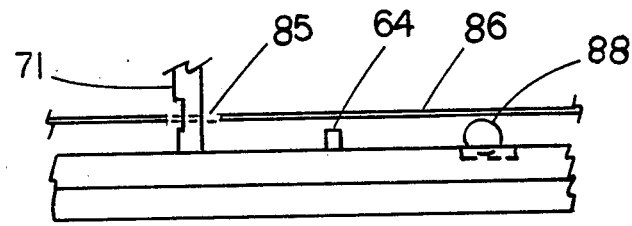
FIG. 8 is a partial cross-sectional view of a portion of the cassette of FIG. 3 showing portions of two plates and a portion of the top of the box of FIG. 7.
Figure 9:
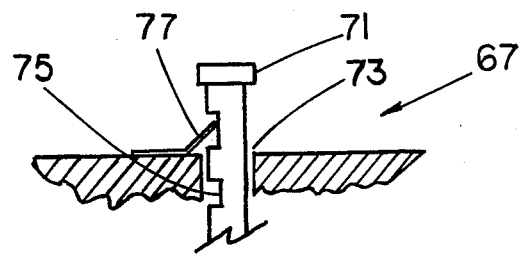
FIG. 9 is a partial cross-sectional view of the top locking mechanism for the cassette shown in FIG. 6 taken through lines C—C.

FIG. 5 shows cassette 44 mounted on seed distribution system 28 which has been previously described. The perforations in the lowermost plate 66 align with bore holes 32 of the distribution system. In the preferred embodiment the lower most plate 66 is the only plate which is not enabled to slide relative to its adjacent plate.

Plate 66 cannot house seeds because there is no mechanism to block the seeds from falling out due to gravity.

As can be seen in FIG. 5, second from the bottom plate 57 has been slid to align with the bottom plate 66 so that its perforations are aligned with those in bottom plate 66 permitting the seeds which were in the perforations in second from the bottom plate 57 to pass through the perforations in plate 66, through bore holes 32, through distribution tubes 40, and into containers 34 for planting. The tray 33 is then removed and a new tray is placed under the tubes 40 and the next higher up plate is slid inwardly along with all of the other remaining seed containing plates so that the next layer of seeds may drop into the containers.

In the preferred embodiment one must always start from the bottom of the cassette and move upwardly in releasing seeds through channels 74 created by the alignment of the empty lower plates.

The plates may be prevented from coming apart in the vertical direction by utilizing housing 76 which receives the stacked plates. The housing 76 is opened on each end 78 and may include closed sides 80. The lower most plate 66 is held in position by lower rim 82 which runs along both sides of the container in the longitudinal direction and by rim 84 which occurs on each end of the housing. Rim 84 is raised only to the extent of the thickness of bottom plate 66. Elongated hole 85 is adapted to receive a portion of rod 71 from the upper locking mechanism. Hole 87 is adapted to receive rod 79 from the lower locking mechanism. The top plate 48 will be adjacent to top rim 86 of the container. Actual contact with the longitudinal portions of top rim 86 are made with rollers 88 which are received in slots 90 in the upper most plate. Rollers 88 are only received in the top plate. The position of rollers 88 may be better seen in reference to FIG. 8 which shows that rollers 88 extend above the top of rod 64 and rod 71 passes through elongated hole 85. Thus the top plate 48 may readily be slid without substantial frictional problems with respect to rim 86.

The seeding cassette as above described may be operated as follows. The cassette 44 is loaded by placing a single seed in each of the perforations in the top plate 48 and the various lower plates are slid relative to one another until these seeds become located in the perforations of second to the bottom plate 57. This process continues until the cassette is fully loaded with seeds. The cassette is mounted on distribution system 28 with the perforations on the bottom plate 66 aligning with bore holes 32.

Rod 71 is pulled slightly upwardly the full thickness of lower plate 66, freeing the seed containing plates to slide together. Rod 71 will keep the seed containing plates from sliding relative to one another. The seed containing plates including plate 57 are slid to the right until the perforations in plate 57 align with the perforations in lowermost plate 66. The seed from the perforations in second lowest plate 57 then drop through the perforations in lowermost plate 66 through channels 32 in distribution system 28 through tubes 40 and into individual containers 34 of tray 33. Rod 79 of lower locking mechanism 69 is then pushed upwardly the distance of the thickness of one plate thereby keeping the lower plates which do not contain seeds from moving. The tray housing 33 is then removed and a new housing is placed under tubes 40. Rod 71 is then moved upwardly the distance of the thickness of the next plate. Plate 53 together with all the remaining seed containing plates are then removed to the left aligning the perforations in plate 53 with the perforations in the lower plates which have been locked in by rod 79. The seeds from plate 53 are then dropped and rod 79 is moved upwardly another notch. The above process continues for each seed containing plate moving from the lower plates toward the upper plates until the cassette is empty.

The invention described above is set forth in the appended claims however it is apparent that many modifications may be made thereof without departing from the true sprit and scope thereof.

We claim:

1. A method for depositing articles from a cassette containing a plurality of stacked plates with each plate having a plurality of perforations; said plurality of plates including a plurality of article containing plates and at least one non-article containing plate comprising the steps of:
   misaligning the perforations of adjacent plates so that the solid portions of a plate form a bottom for the perforations in the upper adjacent plate;
   simultaneously moving all of said article containing plates;
   aligning the perforations of the lowermost article containing plate with the perforations of a non-article containing plate;
   progressively passing the articles in each lowermost article containing plate through said perforations in said non-article containing plates whereby said lowermost article containing plate becomes a non-article containing plate.

2. A method as set forth in claim 1 further including the step of restraining said non-article containing plates from moving.

3. A method for sowing seeds from a cassette having a plurality of vertically stacked plates including a bottom plate and a plurality of upper plates, each of said plates having a plurality of spaced perforations, said perforations in a pattern which is uniform from plate to plate wherein at least the majority of said perforations in said upper plates are adapted to trap at least one seed by misaligning the perforations of one plate between perforations of adjacent plates comprising the steps of:
   simultaneously moving all of said upper plates with respect to said bottom plate; then, progressively aligning the perforations of the lowest seed containing upper plate with the perforations of said bottom plate; passing the seeds of said lowest seed containing upper plate through the perforations of the bottom plate.

4. A method as set forth in claim 3 further including the steps of removing the seeds beginning with the lowest and ending with the highest plate of said plurality of upper plates until all the seeds have moved through the perforations.

5. A method as set forth in claim 3 further including the step of preventing said plurality of upper seed containing plates from moving prior to the beginning of sowing the seeds.

6. An apparatus for depositing articles comprising:
   means for shiftably arranging a plurality of adjacent plates one on top of the other, said plurality including a plurality of plates stacked above a bottom plate; said plates each having a plurality of spaced perforations therein; each plate having substantially the same perforation pattern; each of said perforations of said plates stacked above said bottom plate adapted to trap at least one article when the perforations of one plate are misaligned with perforations of adjacent plate;
   means for simultaneously moving the portion of the stack of plates having said trapped articles relative to said bottom plate for progressively aligning the perforations in the bottom plate of said portion with the perforations of said lowermost plate in said stack of plates whereby the articles in the perforations of said lowermost plate in said portion may drop through the perforations in the non-article containing plates.

7. An apparatus as set forth in claim 6 wherein said articles are seeds.

8. A cassette for carrying and dropping seeds comprising:
a plurality of plates stacked vertically one upon the other forming adjacent layers of plates; said plurality of plates including a bottom plate and a plurality of progressively higher plates; each of said plates having a pattern of perforations; said perforations arranged in substantially the same pattern on each plate; said pattern comprising a pattern of perforations in at least one row; said perforations separated by uniform unperforated spaces between said perforations; each perforation in said plurality of higher plates adapted to contain at least one seed when adjacent plates are offset such that the perforations of a plate overlay the unperforated spaces of the next lower plate whereby a plurality of seed traps are defined;
means for enabling seed containing plates to move simultaneously relative to said bottom plate whereby said perforations in the lowest seed containing plate progressively may be aligned with said perforations in said bottom plate so that the seeds may drop for planting.

9. A cassette as set forth in claim 8 further including means for holding said plates in a stacked arrangement.

10. A cassette as set forth in claim 9 wherein said means for holding is a partially open box surrounding portions of the stack of plates.

11. A cassette as set forth in claim 10 wherein said box has at least a partial cover over a portion of the top plate of the stack; means connected to said top plate to reduce friction between said cover and said top plate.

12. A cassette as set forth in claim 11 wherein said means to prevent friction is at least one roller resting in a slot in said top plate.

13. A cassette as set forth in claim 8 wherein said pattern of perforations are arranged in a plurality of rows and columns in each plate with unperforated spaces between the perforations from row to row and column to column.

14. A cassette as set forth in claim 8 further including means for limiting movement distance of each progressive plate from alignment of the perforations of each plate with the unperforated spaces of said bottom plate to alignment of perforations with the perforations of said bottom plate.

15. A cassette as set forth in claim 14 wherein said means for limiting includes an elongated recess in said at least one plate and first rod through said recess.

16. A cassette as set forth in claim 8 wherein when said cassette is fully charged with seeds one end of each plate projects beyond the end of its adjacent plate.

17. A cassette as set forth in claim 8 further including means for selectively preventing said plate from moving relative to one another.

18. A cassette as set forth in claim 17 wherein said means for preventing movement includes a first slot extending through each of said plates and a second rod slidably received in said slot.

19. A cassette as set forth in claim 8 further including means for preventing the plates from sliding relative to one another after said perforations of each plate have been aligned with the perforations of the bottom plate.

20. A cassette as set forth in claim 19 wherein said means for preventing includes a second slot through each of said plates and a third rod slidably received in said second slot.

* * * * *